March 4, 1958    H. E. STUBBS ET AL    2,825,872
PARTICLE ANALYZING APPARATUS
Filed June 23, 1953    6 Sheets-Sheet 1
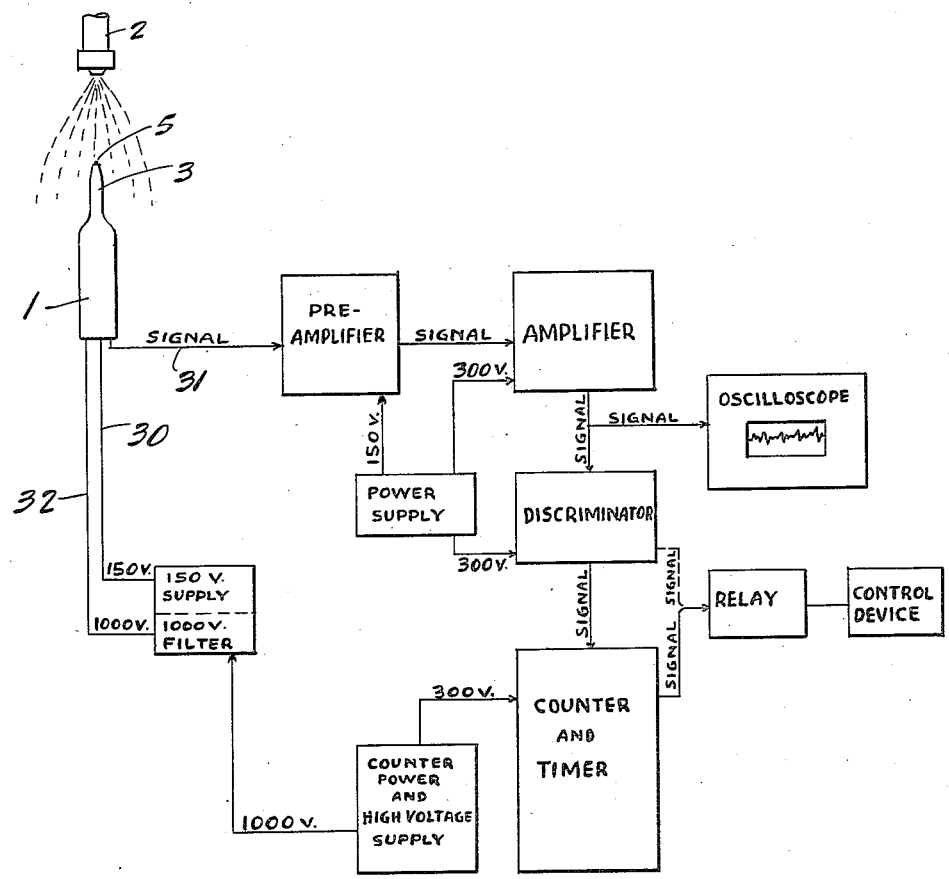
FIG-1-
HARRY E. STUBBS,
HERBERT H. CANFIELD,
    INVENTORS.
BY    W. P. Carr
    ATTORNEY.

March 4, 1958 H. E. STUBBS ET AL 2,825,872
PARTICLE ANALYZING APPARATUS
Filed June 23, 1953 6 Sheets-Sheet 2
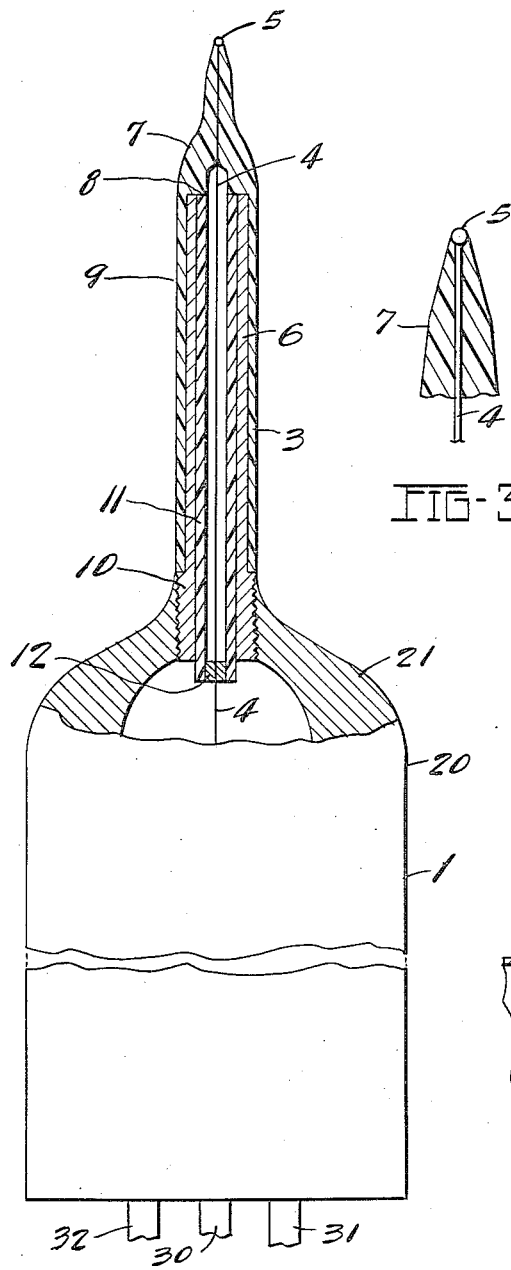
FIG-2-
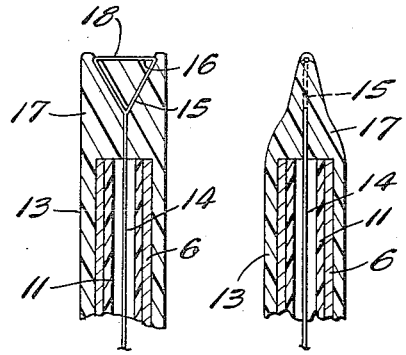
FIG-3- FIG-4- FIG-5-
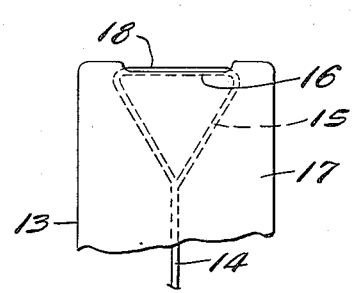
FIG-6-
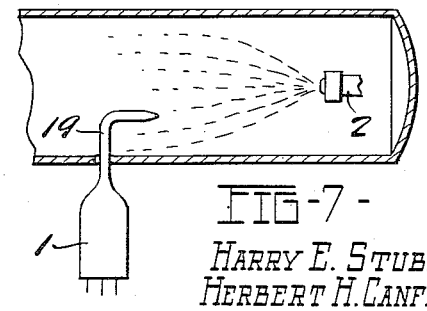
FIG-7-
HARRY E. STUBBS,
HERBERT H. CANFIELD,
INVENTORS.
BY W. P. Carr
ATTORNEY.

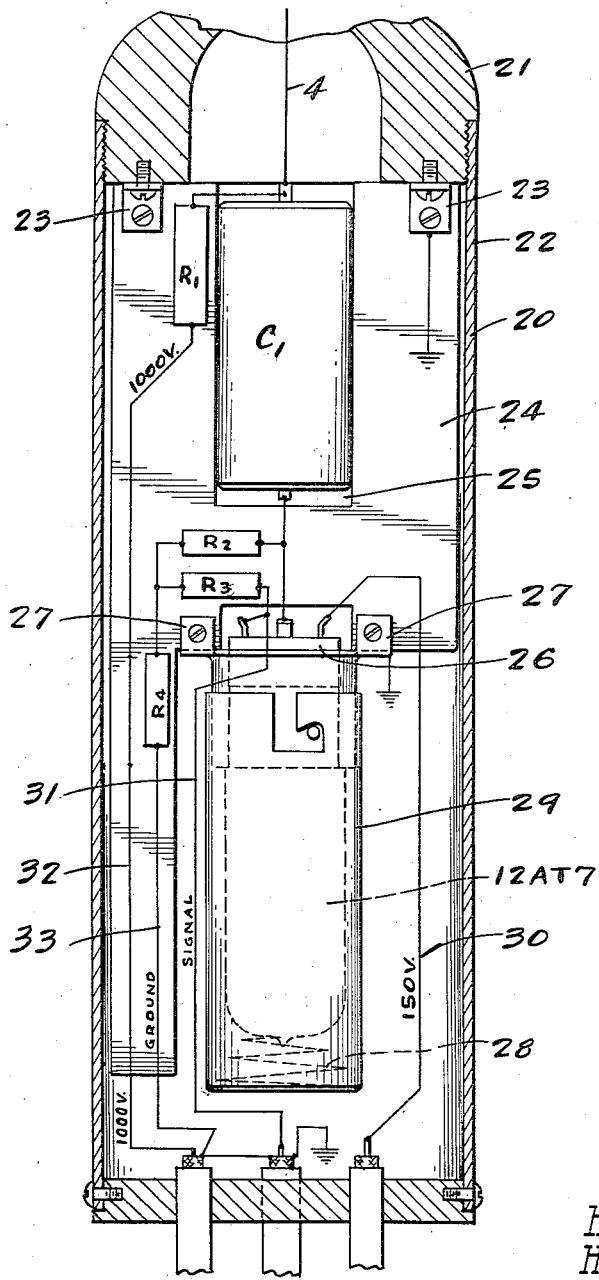

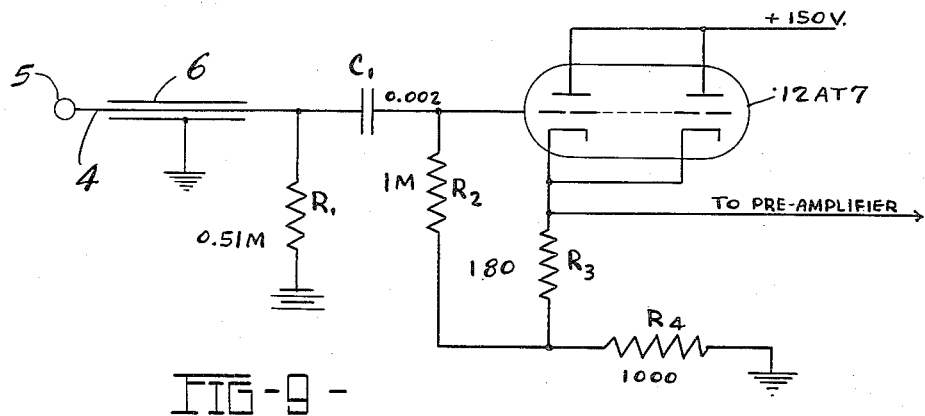
FIG-9-
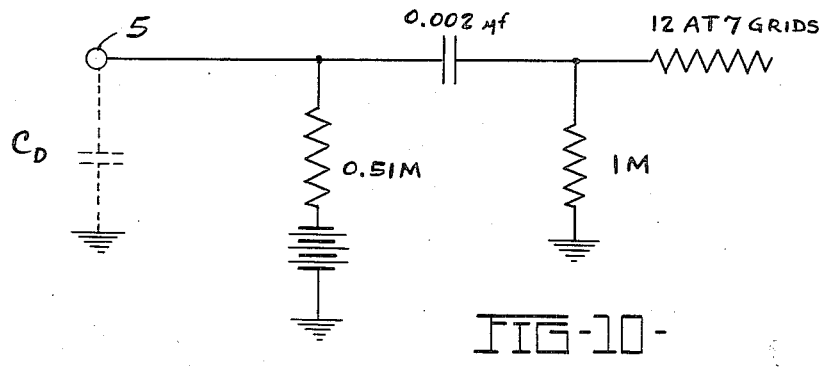
FIG-10-
Harry E. Stubbs,
Herbert H. Canfield,
INVENTORS.
BY W. P. Carr
ATTORNEY.

March 4, 1958
H. E. STUBBS ET AL
2,825,872
PARTICLE ANALYZING APPARATUS
Filed June 23, 1953
6 Sheets-Sheet 5
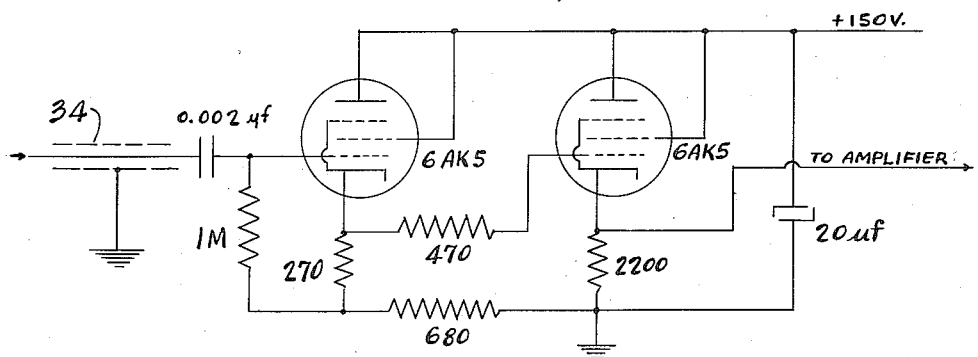
FIG-11-
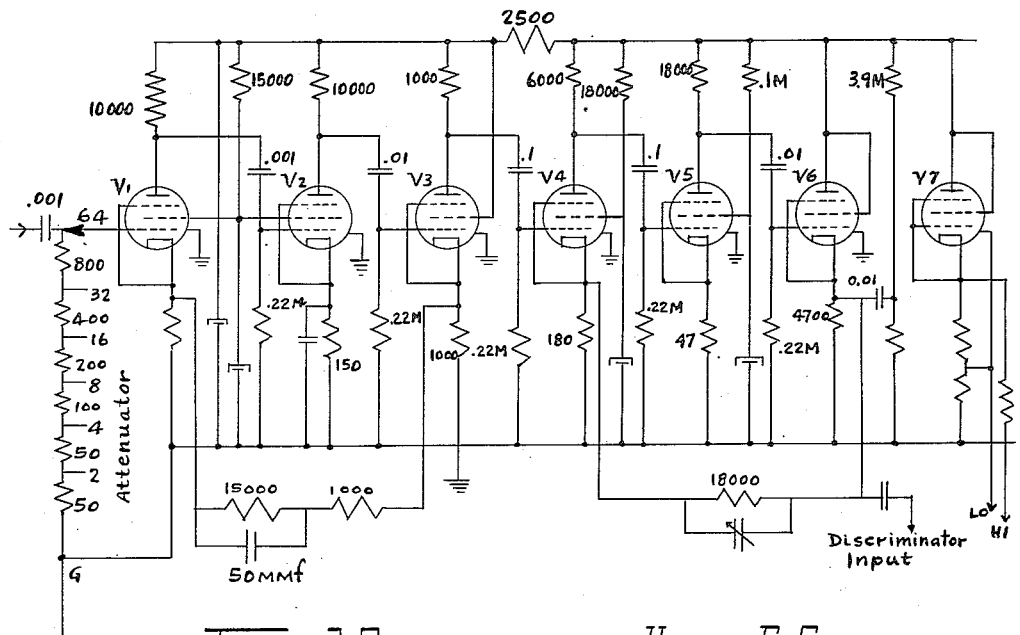
FIG-12-
HARRY E. STUBBS,
HERBERT H. CANFIELD,
INVENTORS.
BY W. P. Carr
ATTORNEY.

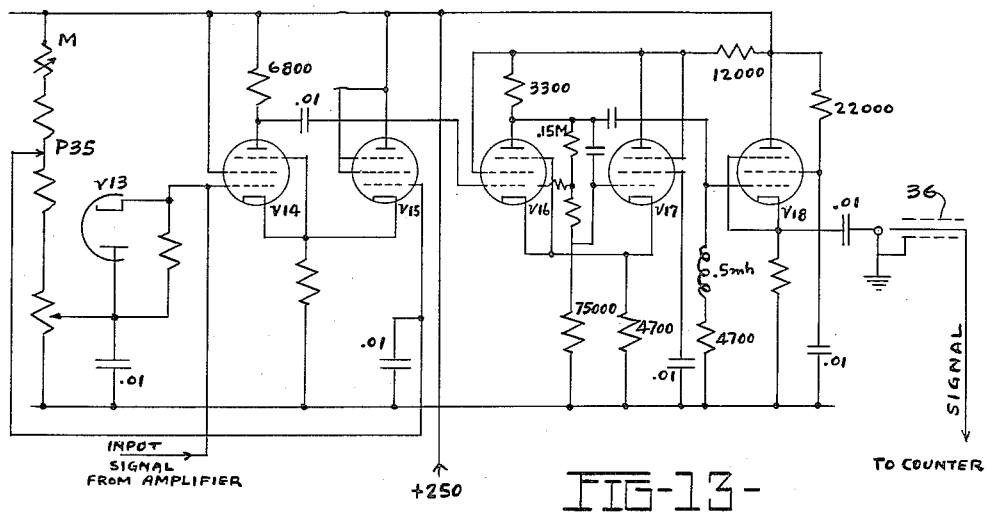
FIG-13-
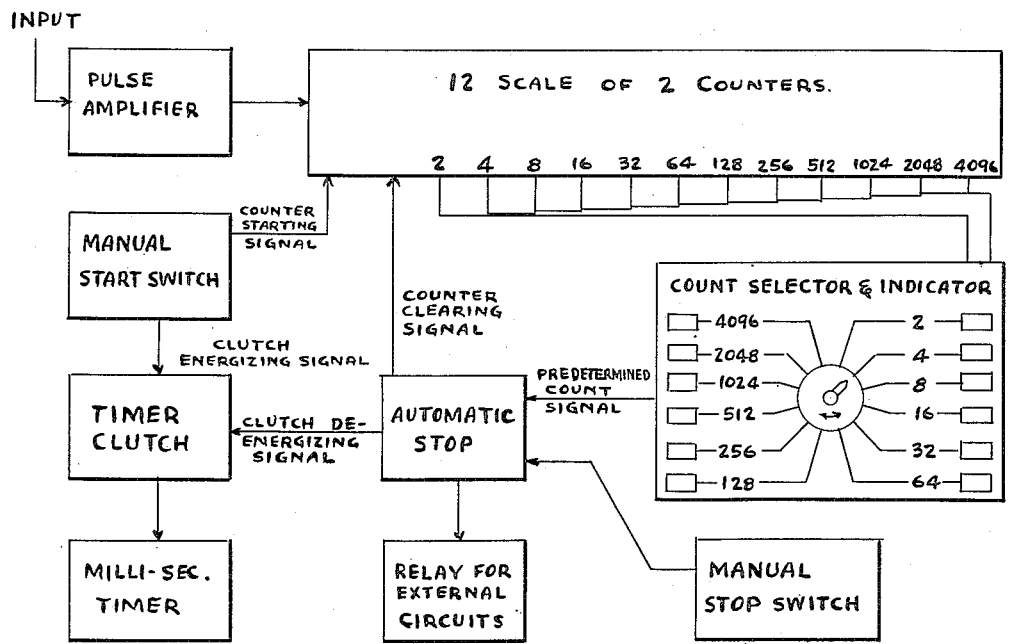
FIG-14-
HARRY E. STUBBS,
HERBERT H. CANFIELD,
INVENTORS.
BY W. P. Carr
ATTORNEY.

United States Patent Office 2,825,872
Patented Mar. 4, 1958

2,825,872

PARTICLE ANALYZING APPARATUS

Harry E. Stubbs, Ann Arbor, and Herbert H. Canfield, Pinckney, Mich., assignors, by mesne assignments, to The De Vilbiss Company, Toledo, Ohio, a corporation of Ohio Application June 23, 1953, Serial No. 363,594

24 Claims. (Cl. 324—71)

This invention relates to apparatus for determining sizes, count and distribution of particles in a projected spray or other suspension of comminuted liquid or solid matter; and more particularly to such apparatus adapted to analyze particles of electrically conductive material.

Moving or stationary atomized suspensions or dispersions of liquid or powdered materials are present in innumerable productive, research and service processes. Some examples of these are the atomization of petroleum products for combustion purposes, the spraying of protective and decorative finishing materials, the nebulization of therapeutic materials, the spraying of water in humidification, the diffusion of insecticidal aerosols, and dehydration spraying of food and other substances. Besides these, there are less known processes in high number utilizing comminuted materials either as final products or in intermediate stages. In a great many and probably a substantial majority of such processes the degree of and variation in fineness of the particles have a crucial bearing on the success of the operation.

The determination of the characteristics of particles in other types of dispersions may also be of real importance. For instance in air pollution an excessive quantity of particles of certain sizes may constitute a severe health or fire hazard. The analysis of particles in exhaust gases may indicate inefficient or improper operation of a preceding combustion or chemical process. In the air conveyance of solid particles as fluidized solids the detection of abnormal particle sizes or rates could be vital to an associated operation.

With such processes or in such situations the final effects or results have been the main basis for determining satisfactory performance or conditions. Forecast of favorable action has been derived principally from visible inspection of the form of atomization or particle dispersion. In view of the physical limitations of the human eye as well as other restrictive factors such as enclosures, varying illumination, speed of particle travel and nature of the material such inspection is narrow in scope and irregular in exactness. Various more scientific methods have been attempted but have proved too tedious and incomplete for other than specialized uses.

The principal object of this invention is the provision of means for rapidly and accurately evaluating the size, count and distribution of particles of a spray or suspension of liquid or powder.

A further object of the invention is to provision of such apparatus which is easy to manipulate and from which information may be readily obtained.

An additional important object of this invention is the provision of such apparatus which analyzes the particle characteristics in their pre-established course and distribution with minimum disturbance thereto.

Another object is to provide such apparatus of a self-contained portable nature so that its utility is not confined to a fixed location.

This invention, by which these and other objects and advantages are attained, comprises an apparatus having a particle intercepting member to be moved through a stationary suspension of particles or variously placed in the path of a projected spray or current of particles.

The intercepting member includes an electrically conductive sensing element presenting a surface of minimum area and having a uniform electrical field for contact with successive individual particles. The sensing element is so associated with an electrical system forming a part of the apparatus that a change in electrical potential upon the element arising from contact with a particle is recorded, measured and counted. The apparatus is so devised that no interference develops between electrical pulses caused by an extremely high number of particle contacts per second. With one form of the disclosed electrical system reporting of 30,000 particle contacts per second has been obtained.

In any diversion of a spray stream the course of smaller particles is changed more than the course of those larger. Analysis of stream particle sizes is thus more difficult at a point of diversion. Also, particles attaching themselves to the intercepting member for any length of time may enlarge its capacitance or alter the surrounding electrical field to a degree adversely affecting the size of subsequent pulses. The intercepting member of this invention is accordingly built to obstruct and divert the flow of projected particles a minimum degree and to rapidly shed material impinged upon its surface.

In one utilization of the invention the particle sensing element is charged to 1000 volts and the particles to be analyzed are conductive materials from which any charge has been removed by grounding the spray nozzle or other source device. When the sensing element is contacted by a particle, its voltage momentarily decreases by an amount proportional to the increase in capacitance of the sensing element due to the addition thereto of the capacitance of the contacting particle. This voltage drop creates a pulse signal which is delivered through a capacitor to a multi-stage electronic amplifier, an electronic pulse size discriminator and finally to an electronic pulse counter.

The pulse signals are the same magnitude for particles of equal size and vary in magnitude according to the approximate 1.5 power of the particle diameter. As the pulse signal formed in the sensing element has very little power by which its relative height may be directly determined, the pulse signal is amplified through successive stages to a size that may be accurately gauged by the electronic discriminator.

The discriminator is an electronic device which will transmit only those pulses of or greater than a critical size. The value of the critical size is governed by a potentiometer and may be set by adjustment of the potentiometer according to an established calibration, to transmit pulses caused by drops of or greater than a certain size, hereafter referred to as the limit control size. Thus it is possible to obtain a count of the number of drops of the limit control size or larger of the dispersion which contact the sensing element.

The setting of the potentiometer may be first adjusted with a high threshold for transmission of pulses of a relatively substantial voltage fixing the particle limit control size well up in the scale of particle sizes of the dispersion being tested. The pulses then received by the discriminator are not excessive in quantity relating only to particles of such limit control size or larger. In passing through the discriminator these pulses are reformed to a uniform and countable character.

For a more complete analysis of the dispersed particles the setting of the potentiometer is adjusted for successively smaller particle limit control sizes. Since all pulses above the limit control size are included in each count it is necessary to deduct the preceding count from each successive count in order to determine the number of particles in the range between two successive limit control sizes. This course may be followed in as fine a division of particle size as required.

The counter receives the pulses transmitted by the discriminator and is associated with an electric timer which may record the time of counting a preselected number of pulses; or having the counter controlled by the timer, a record of the number of pulses registered within a selected period of time may be determined.

In case the particle count and size distribution is not uniform through a cross-section of the mass of dispersed particles, the intercepting member may be positioned variously across the mass for recording particle characteristics at different points.

In case a record of particle size is not necessary and an oscilloscope would provide the data on particle size desired, such an instrument may be connected to the amplifier in place of or in addition to the discriminator. This arrangement permits an observing attendant to act promptly to adjust controls of a process should the oscilloscope indicate an abnormal array of particle sizes. Similarly the discriminator may be associated with an automatic control, operative, upon delivery of pulses of an undesirable nature or rate, to modify or terminate the action of the process.

Other objects, advantages and possible applications of this invention will become apparent upon reading the following description and referring to the drawings, in which Figure 1 is a diagrammatic presentation of a complete apparatus embodying the invention with various components shown in block form;

Figure 2 is an enlarged vertical section of the intercepting instrument of Figure 1;

Figure 3 is a fragmentary enlargement of the upper pointed end of the probe portion of the instrument of Figure 2;

Figure 4 is a vertical section of an alternate form of probe;

Figure 5 is a similar section of the probe of Figure 4 taken 90° about the axis from the section of that figure;

Figure 6 is a fragmentary enlargement of the upper end of the probe section of Figure 4;

Figure 7 is a side elevation of an intercepting instrument with a third form of probe;

Figure 8 is an enlarged vertical section of the base of the intercepting member;

Figure 9 is a diagram of the circuit of the intercepting instrument;

Figure 10 is a diagram of an equivalent circuit of the circuit of Figure 9;

Figure 11 is a diagram of the circuit of the preamplifier;

Figure 12 is a condensed diagram of the amplifier circuit;

Figure 13 is a like diagram of the discriminator circuit; and

Figure 14 is a block diagram of the counter and timer assembly.

Referring to the drawings in more detail, the intercepting instrument 1 as shown in Figures 1 and 2 is positioned in the path of a spray to be analyzed discharged by nozzle 2. Axially within the pencil-like probe 3 of the intercepting instrument is a sensing element 4 of wire form. On the outer end of the element is a partially exposed spherical tip 5. In one useful embodiment of the invention the element is .010 of an inch in diameter and the spherical tip is .020 of an inch in diameter. For its resistance to corrosion and its high electrical conductivity platinum is preferred as the material for element 4 and its tip 5. However, various conducting materials of various diameters may be employed for differing circumstances. Through the base of instrument 1 the element is connected to a constant potential source. A satisfactory potential for a broad range of conditions is 1,000 volts.

The main body of the pencil-like probe 3 is composed of polystyrene selected for its insulating and low dielectric properties. The casing of polystyrene covers the complete element except for the hemispherical tip 5. The end of the probe 3 is tapered and directed toward approaching particles to minimize its deflecting and disturbing effect upon the traveling spray particles, and the outer surface of the probe is coated with a material of a minimum wetting and adhesive nature to discourage attachment thereto of spray particles or the spreading into a film by liquid spray particles. An acrylic resin has been found to be a very satisfactory coating.

To reduce the tendency of the element to pick up stray electrical noise a brass cylindrical shield 6 is coaxially imbedded in the probe 3. The shield may have an outside diameter of ¼ of an inch with a probe diameter of ⅜ of an inch.

The individual parts making up the probe assembly, built around the axially positioned sensing element 4 with its spherical tip 5, include the tapered cap 7 of polystyrene encasing a portion of the sensing element and extending over the lower half of the spherical tip. The cap 7 has an inner shouldered section 8 against which the end of the brass shield is set. Fitting over the shield is a cylindrical polystyrene shell 9, an extension of the cap 7, which extends to a shoulder formed by an enlarged end 10 of the shield. Fitted within the shield is a polystyrene tube 11, the outer end of which has a plastic plug 12 holding the sensing element in its axial position.

While the form of probe 3 and sensing element 4 as illustrated in Figures 1 and 2 is believed preferable for general use and is the main form referred to herein other forms may be advantageously applied to special conditions. For instance when the occurrence of particles is of low frequency a sensing element with a larger exposed area than the tip 5 will contact more particles and furnish a more rapid analysis.

An example of such a probe and sensing element is illustrated in Figures 4, 5 and 6. This probe 13 is somewhat wedge shaped. The sensing element 14 is generally axially located but instead of ending in a spherical tip has an endless loop 15. A straight section 16 of this loop is covered by the polystyrene casing 17 only at its ends and along its lower half. The exposed hemi-cylindrical portion 18, while providing considerably more contact area retains the valuable characteristic of tip 5 of developing a uniform electrical field when charged. This is of utmost importance as otherwise particles of the same size create pulses of varying amplitude on contact with different points of the exposed surface. Except for the end, the probe is similar in construction to probe 3 and has the brass shield 6 embedded in its cylindrical portion and the inner polystyrene tube 11.

Where particles are traveling through a grounded conductive duct, such a duct serves the purpose of the brass shield 6 and a modified unshielded probe 19 such as shown in Figure 7 may be utilized. This probe is angled from a side insertion port to face the travelling particles, and being without the embedded shield, may be slenderized to a form less resistant to the natural flow of particles. The main portion of the intercepting instrument is of course in this case out of the particle path.

The spray nozzle 2 or other source of dispersed particles is grounded to remove any electrical charge on the particles. Accordingly, when a conductive uncharged particle contacts the exposed tip 5, an electrical charge varying with the size of the particle is drawn from the element 4 and momentarily reduces the potential of the element. The negative pulse or signal thus created is transmitted through a capacitor and a cathode-follower connected input stage in the base of the instrument and thence through electronic amplifiers which increase its amplitude and power to a degree that makes it measurable and countable by subsequent electronic equipment.

The time constants of the constant potential source for the sensing element and the amplifier and subsequent recording circuits must be very short to accommodate the frequency of particle contacts. For instance, elements of the charging circuit are selected to give a charging time constant of approximately $10^{-6}$ to $10^{-7}$ second. As the potential changes produced by particle contacts take place in far less time than $10^{-6}$ second the recharging of the sensing element does not interfere with the formation of the particle pulse or signal.

The signal from the sensing element is necessarily in a high-impedance circuit of low power. Since it is desirable to keep all electrical components away from the spray, a transmission of the signal for some 25 feet may be necessary. A low-impedance circuit carrying a pulse of greater power is necessary to eliminate stray noise; therefore the cathode-follower circuit is built into the base of the intercepting instrument. The high input resistance and the low input capacitance of a cathode-follower makes it an ideal input stage for a sensitive instrument.

The cathode-follower acts as an impedance transformer which takes a voltage developed across a relatively high impedance and transfers it to a voltage across a relatively low resistance load, thereby preserving good reproduction of pulse transmitted through a low impedance line. Its low impedance output allows the intercepting instrument to be operated many feet distant from the amplifier. The signal from the instrument passes through a pre-amplifier including a pair of direct-coupled cathode-followers for additional power gain to drive the low impedance amplifier, where the amplitude of the pulse is increased and the signal shape is modified. The signal then passes to a pulse-height discriminator, which discards pulses smaller than a selected amplitude and passes larger pulses through a multivibrator which delivers uniform pulses to the counter.

The circuit in the intercepting instrument base (Figure 9) consists of the sensing element connected to the grid of a 12AT7 dual-triode tube with both sections wired in parallel as a cathode-follower. This circuit provides the low input capacity desired for a short time constant and the low output impedance desired for transmission of the signal. The 12AT7 has the high mutual conductance needed for a high transfer function, approximately 0.9.

Figure 10 is the equivalent circuit of the instrument input, $C_D$ being the distributed capacity of the sensing element and the input capacity of the tube. The charging circuit is made up of the 0.51-megohm resistor and $C_D$. The order of magnitude of $C_D$ is from $1 \times 10^{-11}$ to $2 \times 10^{-12}$ farad; hence the charging time constant is $5 \times 10^5 \times 10^{-11} = 5 \times 10^{-6}$ second maximum, or $1 \times 10^{-6}$ second minimum. This is also the recovery time of the sensing element after a drop has made contact.

The construction of the base 20 of the intercepting instrument 1 and the arrangements of the elements of its circuit are disclosed in Figure 8. The brass head 21 partially shown is also illustrated in Figure 2. It supports the probe 3 and is threadedly connected to the cylindrical casing 22. The head 21 serves as a grounding contact for brass shield 6 of the probe.

Fixed to the lower side of the head 21 by angle brackets 23 is a terminal board 24. The capacitor $C_1$ of the intercepting instrument circuit diagrammatically illustrated in Figures 9 and 10 is supported within a large center notch 25 in the terminal board 24. The sensing element 4 is connected to the upper end of capacitor $C_1$.

Tube socket 26 is fastened in inverted position by small angle holders 27 to the main lower edge of the terminal board. The 12AT7 tube depends from this socket and is held in position by the spring 28 within the shell guard 29. This guard 29, through a connection to the holder 27, is grounded. The capacitor $C_1$ is wired to the grid terminal of socket 26 for delivering pulse signals to the grid of the tube. A line 30 carries 150 volts to the anode or plate terminal. The pulse signal is taken from the cathode terminals by lead 31. The sensing element charging line 32 is connected to the sensing element 4 above $C_1$ through resistor $R_1$. As illustrated in the drawings the grid terminal is connected to ground line 33 through resistors $R_2$ and $R_4$ and the cathode terminal is also connected to this line through resistors $R_3$ and $R_4$. For the dual triode tube 12AT7 there are two terminals for the plate, grid and cathode and a common connection is made to each pair. There are also three filament terminals for the 6 volt filament current. The latter have not been included in the drawings.

The signal from the intercepting instrument reaches the preamplifier circuit shown in Figure 11 through a shielded cable 34. The two tubes 6AK5 of the preamplifier are direct-coupled as cathode followers and give the pulse a slight preparatory voltage gain before its delivery to the amplifier. The circuit of the amplifier is shown in Figure 12. The first stage is a special low-noise 5963 tube (V1). The second is a shock-mounted 6AH6 tube (V2). Additionally, amplifier stages of substantially conventional form may be connected as shown.

The grid meshes (coupling capacitors and grid resistors) have very long time constants relative to signal duration to eliminate formation of overshoots in the grid circuits. The tubes are arranged to take full advantage of their characteristics in the signal direction. The grid must go positive to drive V4 (6AG7) to grid current; however, the tube currents become very large in this region and the cathode bias increases very rapidly, so the signals must be very large to cause grid current. The preceding stage V3 (6AC7) is incapable of supplying signals large enough to overdrive this stage. V5 (6AC7) can be driven to cut-off and effectively operates only in the range of the discriminator.

The amplifier as used in this invention includes selector switches by which the input time constant can be varied from 0.16 to 16 microseconds in seven steps. Rise time, defined as the time required for the output pulse to rise from 0.1 to 0.9 maximum when a pulse is applied to the input, may be varied from 0.2 to 2 microseconds in five steps. Any combination of input time constant and rise time within the limits specified may be used according to conditions.

The voltage amplification varies between 300 and 9000 times with the control of gain effected by an attenuator having 6 decibel steps in the range of 0 to 30 decibels. By virtue of the inverse feed back employed a high order of gain stability is achieved.

The amplifier will accept pulses of either positive or negative polarity with the minimum usable input signal from about 200 microvolts to 1 millivolt depending on the rise setting.

Amplifier output connectors are provided for the discriminator and for an oscilloscope. The amplifier outlet pulse is of positive polarity for either polarity of input signal.

The signal or pulse amplitude discriminator receives the signal from the amplifier. The circuit of the discriminator is presented in Figure 13. The calibrated potentiometer P35 permits accurate setting of the discriminator level. Negative pulses received are eliminated by the first tube, diode V13.

The first pentode V14 of the discriminator is normally non-conducting and its grid potential may be varied within a range extending to 100 volts below the cut-off potential by adjustment of the potentiometer. This tube remains non-conducting for pulses smaller than the cut-off bias determined by the potentiometer. With larger pulses of a size rendering the tube conductive, the plate potential decreases and a negative pulse is delivered to the grid of the third pentode V16. The second pentode V15 serves to maintain a constant potential on the cathode of the first pentode. Uniform and rapid pulse formation for the output of the discriminator is provided by tubes V16 and V17 coupled as a "one-shot multivibrator." A cathode follower V18 transmits the pulses to the counter. It minimizes the capacitive loading effect of the transmitting cable 36. All pulse signals transmitted by the discriminator are transformed into uniform outlet pulses having a 10 volt potential and 0.4 microsecond time constant, a form readily and accurately registerable by the ordinary electronic counter.

One form of counter and timer found adaptable to this invention, the Tracerlab SC–1C Autoscaler, made by Tracerlab Inc., of Boston, Massachusetts, is illustrated in block form in Figure 14. It counts the pulses received from the discriminator and measures the time required within ±0.01 second for the reception of a given number of pulses.

The scale of two units used in the Autoscaler is of the familiar double triode type modified to permit automatic clean-up. There is a total of twelve cascaded scales of two, each separated from the preceding one by a buffer tube biased considerably beyond cut-off to prevent undesirable feed through of spray triggering signals. Overall resolving time is approximately 7 microseconds. The counts obtainable include any power of 2 from 2 to 12, with a minimum number accordingly of 4 and a maximum number of 4096.

The instrument has controls which may be set to stop the counting action after the selected number of pulses has been counted and timed; or may be set for continuous operation with a relay activated at the end of each sequence of the predetermined number of pulses. The relay may be connected to controls of an associated process for desired action correlated with the number of pulses counted.

Suitable power sources for the apparatus are provided as indicated in Figure 1 to deliver the 1000 volt sensing potential to element 4, and operating power of 150 volts to the instrument pulse receiving circuit and the preamplifier circuit. Also for operation of the amplifier, discriminator, counter and timer 300 volts are supplied.

Where visible monitoring of signal frequency and amplitude is helpful an oscilloscope of standard design is connected to the amplifier as illustrated in Figure 1. The connection may be made to either the low level or the high level outlet.

In operation, the intercepting instrument is placed to position the exposed tip of the sensing element in the portion of the spray or other dispersion of particles to be analyzed. In case of a stationary dispersed mass of particles the intercepting instrument may be equipped with a handle for manual support and movement of the instrument into contact with successive particles.

However, a preferable arrangement for such a situation is to have the instrument mounted for mechanical movement. Its path and travel are then more uniform and more accurate recording is obtained.

By means of the potentiometer P35 on the discriminator the critical pulse size is preferably first set so there will be comparatively few particles in the dispersion greater than the particle limit control size correlated to such pulse size. The apparatus is then operated to obtain a rate of contact of particles of and greater than its first limit control size. Subsequently, the potentiometer P35 is adjusted for successively lower particle limit control sizes and on each adjustment the apparatus is operated to determine the rate of contact of particles of sizes of, or greater than, the selected limit control size.

The rate secured at each successive setting includes the rate of particles of the preceding setting. Accordingly, by subtracting the rate obtained from a particular setting from that of a succeeding setting, the rate of particles in the size range between the limit control sizes of the two settings is calculated. In this manner the distribution of particles contacted in various size ranges or classifications is ascertained.

The size division may be fine or coarse dependent upon the requirements of the situation and the whole procedure may be repeated at a number of locations in the mass of dispersed particles.

The exceedingly small area of the exposed tip of the sensing element is of course a relatively minute part of the cross-sectional area of the usual mass of dispersed particles and the recording obtained from the tip relates only to those particles which travel the narrow stream portion leading to contact with the tip.

If the data obtained from the analysis indicates a uniform distribution of particle sizes throughout the dispersed mass, by calculation, a count of all particles within at least a certain, major portion of the mass may be approximated.

One method is applicable in situations where the discharge rate of the spraying or discharging device is known. If, for instance, the sampling indicates an average size of 2 mils diameter for particles of spherical shape with a discharge rate of one pint per minute, the volume of a pint (28.875 cu. in.) is divided by the volume of a spherical particle of 2 mils diameter and it is determined thereby that approximately six billion (5,908,088,875) particles are produced in each minute of discharging time and are present in the mass of particles arising from such a period of operation.

Another method of estimating the number of particles in an overall mass having a uniform dispersion of particles involves a comparison of the contact area of the probe tip with the cross-sectional area of the dispersed mass.

Assuming the probe tip is 20 thousandths of an inch in diameter and therefore presents across-wise contact area of $$\frac{314.16}{1,000,000}$$

sq. in. ($\pi R^2$) and the cross-sectional area of the mass of dispersed particles is 100 sq. inches, the contact area would represent 1/318,300 of the full cross-sectional area. Should the record obtained by the probe show 2,000 particle contacts per second this would indicate a quantity of 2,000 times 318,300 or 636,600,000 particles in the complete stream per second of travel.

For a stationary mass of particles with a cross-sectional area of 100 sq. inches movement of the probe tip lengthwise of the mass through a distance of 10 inches might give a count of 1,000 particles. Multiplying 318,300 by 1,000 would then give a count of 318,300,000 for a 10 inch longitudinal section of the total mass.

In connection with an industrial process where there is a continuous flow of dispersed particles it may be desired to have an uninterrupted check of certain particle size characteristics. For instance in a spray drying operation it may have been determined that a frequency of occurrence above 2048 particles of a diameter exceeding 599 microns within a period of 5 minutes as reported by the intercepting instrument is indicative of atomization below the standard required for satisfactory results.

Accordingly the discriminator is set to transmit pulses corresponding to particles having diameters of 600 microns or more and the timer is set for successive periods of 5 minutes each. If the count reaches the number of 2048 before the expiration of any 5 minute period a relay may be arranged to operate a solenoid valve shutting off flow of material to the spray nozzle and to operate a warning device. If the count does not reach the full number before the end of the period the apparatus may be automatically reset for the subsequent cycle. Alternately, the relay may be associated with and arranged to operate a solenoid valve for increasing the atomizing pressure and thus correcting the faulty atomization.

For checking air pollution in a flour mill, for example, an instrument may be mounted for automatic reciprocation into contact with air borne particles. Reporting of more than 1,000 particles per minute of a size ranging from 50 to 200 microns may have previously been determined to be approaching an explosive concentration.

For such an installation two discriminators would be required, one transmitting pulses corresponding to particles larger than 50 microns and the other transmitting pulses created by particles above 200 microns. Means using the latter pulses to cancel an equal portion of the greater range of pulses would give the count of the desired particle sizes. Completion of the maximum count before the expiration of any one minute period may be made to operate through a relay to give an alarm signal and also may be used to set air exhaust means in operation.

With two discriminators and two counters a simultaneous count of particles in two size ranges may, of course, be recorded.

In an operation where a graph record of particle size distribution is desired the discriminator adjusting potentiometer may be motor driven to move automatically through a range of particle sizes and associated with a synchronously driven chart upon which a recording stylus, governed by the counter, records counting rate changes.

Experience has shown that the pulse generated by the contact of a previously grounded conductive particle with the intercepting member of an instrument embodying this invention varies in size according to the approximate 1.5 power of the diameter of the particle. However, for the sake of accuracy it is recommended that each embodiment be individually tested and the relationship of pulse and particle sizes separately calculated. Possible variations in the operation of electronic elements and other components as well as changed conditions and materials makes this practice advisable.

The term "conductive" has generally been employed herein with its ordinary electrical significance, but it should be remembered that materials have a very wide range of conductivity. It is known that materials with conductivities as low as $10^{-6}(\text{ohm-cm.})^{-1}$ are suitable for detection with apparatus designed according to this invention and it is likely that materials with much lower conductivities could be detected.

While electronic circuits and elements are described and illustrated herein, it should be understood that the extent of disclosure is necessarily limited and that it is within the skill of electronic engineers to devise satisfactory alternate designs including the substitution of transistors and other electrical components for electron tubes and their accessories.

It is intended that the appended claims, except where clearly drawn to this specific disclosure, be interpreted with sufficient breadth to include such alternate designs of electrical apparatus.

We claim:

1. In an apparatus for analyzing characteristics of particles in a dispersed state, a particle contact sensing element of electrically conductive material, means for applying a predetermined unidirectional electrical potential to the element and for rapidly reestablishing the potential upon any variation therein, an exposed section of said element so shaped and restricted in surface area that a previously grounded conductive particle of a certain size will momentarily affect the potential of the element to the same degree on contact with any point of the exposed section, an insulating casing covering the unexposed portion of the element, and electrical means connected to the element and recording variations in the predetermined electrical potential caused by contact of conductive particles with the exposed section of said elements.

2. An apparatus for analyzing the number and size characteristics of dispersed particles flowing in a stream which comprises a probe extending into said stream, said probe shaped to disturb the flow of particles a minimum degree, an exposed electrically conductive particle contacting tip on said probe, the surface of the probe adjacent the tip being of insulating material, means to charge said tip to a predetermined potential and to establish a uniform electric field around said tip, said charging means having a time constant short with respect to the interval between contact of successive particles with the tip, means to amplify and record a pulse resulting from a change in the charge on said tip caused by the contact of a particle therewith, means to vary the effective threshold of said recording means whereby the contact of particles only equal to or exceeding a predetermined size are recorded.

3. In an apparatus for analyzing characteristics of particles in a dispersed state, a particle contact sensing element of electrically conductive material, a limited exposed section of said element, said exposed section shaped to create a substantially uniform surrounding electrical field when electrically charged, means connected to the element for maintaining thereon a certain unidirectional electrical potential and for rapidly reestablishing the certain potential upon any variation therein, and other electrical means connected to the element recording successive variations in the certain electrical potential caused by contact of successive particles with the exposed section of said element.

4. An apparatus for analyzing characteristics of particles in a dispersed state as set forth in claim 3 in which the exposed section of the sensing element presents a compact surface area of a size proportionate to the size and frequency of particles being analyzed whereby contact with more than one particle at a time seldon occurs.

5. An apparatus for analyzing characteristics of particles in a dispersed state as set forth in claim 3 in which the exposed section of the sensing element is half of a sphere and the unexposed section attached to the exposed spherical section includes a wire having a diameter less than that of the spherical section.

6. An apparatus for analyzing characteristics of particles in a dispersed state as set forth in claim 3 in which said element is of wire-like form and the exposed section of said element is a semi-cylindrical portion of the wire-like form joined at both ends with said element.

7. An apparatus for analyzing characteristics of particles in a dispersed state as set forth in claim 3 in which the exposed section of the element has a platinum surface.

8. An apparatus for analyzing characteristics of particles in a dispersed state as set forth in claim 3 in which a casing of electrically insulating material with a low dielectric constant encloses the particle contact sensing element adjacent its exposed section.

9. An apparatus for analyzing characteristics of particles in a dispersed state as set forth in claim 3 in which a casing of electrically insulating material encloses the element adjacent to its exposed section restricting contact with particles by the element to the exposed section having the uniform field.

10. An apparatus for analyzing characteristics of particles in a dispersed state as set forth in claim 9 in which the casing is tapered toward the outer end of the element.

11. An apparatus for analyzing characteristics of particles in a dispersed state as set forth in claim 9 in which there is a grounded electrically conductive tubular shield encompassing a major portion of the casing of insulating material.

12. In an apparatus for analyzing characteristics of particles in a dispersed state, a particle contact sensing element of electrically conductive material, a minor section of the outer end of said element being exposed, means for maintaining the element at a definite electrical potential, additional means associated with the element recording momentary changes in its electrical potential caused by contact with particles, and a casing of an electrical insulating material enclosing the section of the element adjoining the exposed section, said casing having a surface character tending to repel attachment thereto of particles.

13. An apparatus according to claim 14 in which the casing is coated with an acrylic resin.

14. In an apparatus for analyzing characteristics of particles in a dispersed state, a particle contact sensing element of electrically conductive material, a minor section of the outer end of said element being exposed, means for maintaining the element at a definite unidirectional electrical potential, additional means associated with the element recording momentary changes in its electrical potential caused by contact with particles, and a casing of an electrical insulating material enclosing the section of the element adjoining the exposed section, said casing having a surface character tending to reduce wetting thereof by liquid particles.

15. In an apparatus for analyzing characteristics of particles in a dispersed state, a particle contact sensing element of electrically conductive material, a section of the outer end of said element being exposed, means for applying a certain unidirectional potential to the element, and for recording any momentary change in the potential caused by contact with particles, and a casing of an electrical insulating material enclosing the portion of the element adjacent the exposed section, said casing being shaped to present minimum resistance and deflection to a flow of atomized material toward the element.

16. In an apparatus for analyzing characteristics of particles in a dispersed state, a particle contact sensing element of electrically conductive material and of elongated rod-like form, an exposed outer end on said element, means for maintaining a certain unidirectional electrical potential upon the element, and for recording any momentary change in the potential caused by contact with particles, and an insulating casing enclosing the element up to its outer end, said casing of aerodynamic form rearwardly from the outer end whereby it presents minimum resistance and deflection to a stream of dispersed particles directed toward the exposed outer end and in a path generally parallel to the long axis of the element.

17. In an apparatus for analyzing characteristics of particles in a dispersed state, a particle contact sensing element of electrically conductive material and of rod-like form, an exposed enlarged outer end on said element, means for maintaining a certain unidirectional electrical potential upon the element, and for recording any momentary change in the potential caused by contact with particles, and a pencil shaped casing of electrically insulating material enclosing the section of the element adjoining the enlarged outer end, the main cylindrical portion of the casing having a diameter of approximately three-eighths of an inch.

18. An apparatus for analyzing characteristics of particles in a dispersed state as set forth in claim 17 in which a grounded electrically conductive tubular shield approximately one quarter inch in diameter is embedded lengthwise in the cylindrical portion of the casing.

19. In an apparatus for analyzing characteristics of particles in a dispersed state, a particle contact sensing element of electrically conductive material, means for applying a certain electrical charge to the element, and for recording any momentary change in the potential caused by contact with particles, an exposed section of the element of hemispherical shape, and a wire-like section connected to the exposed section, the exposed section being approximately twenty thousandths of an inch in diameter and the wire-like section being approximately ten thousandths of an inch in diameter.

20. In an apparatus for analyzing characteristics of particles in a dispersed state, a particle contact sensing element of electrically conductive material, means connected to the element delivering thereto a certain electrical potential of approximately 1000 volts and rapidly reestablishing the certain potential following any variation therein, and other electrical means connected to the element amplifying and recording variations in the certain electrical potential caused by contact of particles with the sensing element.

21. In an apparatus for analyzing characteristics of particles in a dispersed state, a particle contact sensing element of electrically conductive material, means for maintaining a certain unidirectional electrical potential upon the element, the element having electrical capacitance of limited and definite proportion whereby a change in the potential thereon arising from contact with a particle creates a detectable electrical pulse, electrical means connected with the element amplifying and subsequently recording such pulses, and a capacitor separating said element from said amplifying and recording electrical means.

22. In an apparatus for analyzing characteristics of particles in a dispresed state, a particle contact sensing element of low electrical capacitance, means connected to the element delivering thereto a certain electrical potential of relatively high voltage and rapidly reestablishing the certain potential following any variation therein, and other electrical means connected to the element amplifying and recording variations or pulses in the certain electrical potential caused by contact of particles with the reporting element, said other electrical means including a series of amplifying stages and a coupling capacitor and grid resistor between successive stages, said coupling capacitor and grid resistor having a time constant greatly in excess of the signal duration of such variations or pulses.

23. In an apparatus for analyzing characteristics of particles in a dispersed state, a particle contact sensing element of electrically conductive material, a limited exposed section of said element, said exposed section shaped to create a substantially uniform surrounding electrical field when electrically charged, means connected to the element for delivering thereto a certain electrical potential and for rapidly reestablishing the certain potential upon any variation therein, and other electrical means connected to the element recording successive variations in the certain electrical potential caused by contact of successive particles with the exposed section of said element and recording a count of successive variations of preselected size range.

24. An apparatus for analyzing characteristics of particles in a dispersed state as set forth in claim 23 in which the other electrical means simultaneously records independent counts of successive variations of a plurality of preselected size ranges.

References Cited in the file of this patent

UNITED STATES PATENTS

| 1,168,227 | Schmidt | Jan. 11, 1916 |
| 1,405,122 | Harris | Jan. 31, 1922 |
| 1,670,640 | Smith | May 22, 1928 |
| 2,285,152 | Firestone | June 2, 1942 |
| 2,491,445 | Cunningham et al. | Dec. 13, 1949 |
| 2,601,649 | Wadman | June 24, 1952 |
| 2,666,896 | Harris | Jan. 19, 1954 |

OTHER REFERENCES

Automotive Industries, June 1, 1951, pages 52 and 88.